US008441574B2

(12) United States Patent
Dunn et al.

(10) Patent No.: US 8,441,574 B2
(45) Date of Patent: May 14, 2013

(54) VISUAL IDENTIFIER FOR IMAGES ON AN ELECTRONIC DISPLAY

(75) Inventors: William Dunn, Alpharetta, GA (US); Rick De Laet, Alpharetta, GA (US); John Schuch, Buford, GA (US); Jerry Wasinger, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 332 days.

(21) Appl. No.: 12/763,797

(22) Filed: Apr. 20, 2010

(65) Prior Publication Data

US 2011/0096246 A1 Apr. 28, 2011

Related U.S. Application Data

(63) Continuation-in-part of application No. 12/706,594, filed on Feb. 16, 2010, and a continuation-in-part of application No. 12/706,602, filed on Feb. 16, 2010.

(60) Provisional application No. 61/308,139, filed on Feb. 25, 2010, provisional application No. 61/152,876, filed on Feb. 16, 2009.

(51) Int. Cl.
*H04N 7/08* (2006.01)

(52) U.S. Cl.
USPC .......................................................... 348/460

(58) Field of Classification Search ............... 348/189, 348/192, 180, 181, 175, 177, 552, 553, 460–461, 348/465, 467; 705/50
See application file for complete search history.

(56) References Cited

U.S. PATENT DOCUMENTS

| 4,271,410 | A | 6/1981 | Crawford |
| 4,456,910 | A | 6/1984 | Dimassimo |
| 5,115,229 | A | 5/1992 | Shalit |
| 5,162,645 | A | 11/1992 | Wagensonner |
| 6,297,859 | B1 * | 10/2001 | George ................. 348/747 |
| 6,546,294 | B1 | 4/2003 | Kelsey |
| 7,480,042 | B1 | 1/2009 | Phillips |
| 2002/0163513 | A1 | 11/2002 | Tsuji |
| 2003/0117428 | A1 | 6/2003 | Li et al. |
| 2003/0161354 | A1 | 8/2003 | Bader et al. |

(Continued)

FOREIGN PATENT DOCUMENTS

| JP | 2002064842 | 2/2002 |
| JP | 2002209230 | 7/2002 |
| JP | 2005236469 | 9/2005 |
| WO | 9608892 | 3/1996 |

OTHER PUBLICATIONS

Teravision Corp., LCD-TV Panel Control Board Specification, Nov. 2007, 24 pages.

*Primary Examiner* — Paulos M Natnael
(74) *Attorney, Agent, or Firm* — Standley Law Group LLP

(57) ABSTRACT

A system and method for displaying images or video on an electronic display. A unique identifier may be embedded within the frames of images or video and detected by a light sensor. The data from the light sensor is analyzed to determine if the proper image or video was actually shown at the display. Some embodiments analyze the data from the light sensor in real time and may stop displaying the image or video if the data is not in the format of a unique identifier. Using this embodiment, the system can prevent unintended images or video from being shown on the display.

16 Claims, 5 Drawing Sheets

U.S. PATENT DOCUMENTS

| | | |
|---|---|---|
| 2003/0196208 A1 | 10/2003 | Jacobson |
| 2004/0114041 A1* | 6/2004 | Doyle et al. ................. 348/182 |
| 2004/0138840 A1 | 7/2004 | Wolfe |
| 2004/0207738 A1 | 10/2004 | Wacker |
| 2005/0289061 A1* | 12/2005 | Kulakowski et al. ........... 705/50 |
| 2007/0152949 A1 | 7/2007 | Sakai |
| 2007/0168539 A1 | 7/2007 | Day |
| 2007/0247594 A1 | 10/2007 | Tanaka |
| 2008/0112601 A1 | 5/2008 | Warp |
| 2008/0170028 A1 | 7/2008 | Yoshida |

* cited by examiner

VISUAL IDENTIFIER FOR IMAGES ON AN ELECTRONIC DISPLAY

CROSS-REFERENCE TO RELATED APPLICATIONS

This application is a non-provisional patent application of U.S. Application No. 61/308,139 filed on Feb. 25, 2010 and is herein incorporated by reference in its entirety. This application is a continuation-in-part of U.S. application Ser. No. 12/706,594 filed Feb. 16, 2010 which is a non-provisional of U.S. Application No. 61/152,876 filed Feb. 16, 2009 each of which are hereby incorporated by reference in their entirety. This application is a continuation-in-part of U.S. application Ser. No. 12/706,602 filed Feb. 16, 2010 which is a non-provisional of U.S. Application No. 61/152,876 filed Feb. 16, 2009 each of which are hereby incorporated by reference in their entirety.

TECHNICAL FIELD

Exemplary embodiments generally relate to a light sensor placed in front of an electronic display to monitor actual display performance.

BACKGROUND OF THE ART

Electronic displays have previously been used predominantly in indoor entertainment applications such as home theatres and bars/restaurants. However, as the performance characteristics and popularity have grown, electronic displays are now being used in many new environments for both entertainment as well as informational and advertising purposes. Displays are now used in airports, shopping malls, sides of buildings, arenas/stadiums, menu boards, and as advertising signs and/or billboards. Exemplary displays are also used for both indoor and outdoor environments.

Over many hours of use, even the most reliable electronic displays are known to degrade in performance or possibly have one or more components fail prematurely. When a display is used for advertising purposes, a sudden failure or degradation in performance can result in the loss of critical advertising exposure and possible revenue to the advertising firm. Further, when a display is used for information, a failure of the display may result in the loss of critical information such as flight schedules or emergency alerts. Also, in some applications a display is required to maintain a certain level of performance (ex. gamma, contrast, luminance, color saturation, etc.). A user may want to monitor the various parameters of the display to determine when the display may begin to degrade in performance.

When displays are used for advertising purposes, it may be desirable to include the capability to monitor the performance of the displays. More specifically, it may be desirable to confirm that the advertisement was successfully shown on the display. Collecting and storing the confirmation data may be useful to advertisers which desire the specific times, frequency, and location data for their advertisements. It may also be desirable to ensure that the video/images being sent to a display cannot be tampered with or to ensure that undesirable content cannot be shown on a display.

SUMMARY OF THE EXEMPLARY EMBODIMENTS

Exemplary embodiments create a unique identifier for each unique piece of video/image content. The unique identifier may be encoded and sent to a portion of the image-producing electronic display assembly (information block) for displaying simultaneously with the video/image content. The information block may be measured by a light sensor where this data is then decoded and stored. The decoded data can later be compared with the original unique identifier in order to confirm that the image was actually shown on the display and when. The unique identifier can be created in a number of ways, either manually, through random assignment, or through a software analysis of the video/image content data. Optionally, either while the data is being decoded or after the decoding is complete, it may be analyzed to determine if the video/image being shown is intended for display. Thus, if a unique identifier is not present or is in an improper format then the video/image being displayed is not intended and may immediately be removed from the display. Thus, exemplary embodiments can not only provide confirmation that a video/image was shown but can also provide a level of security so that unauthorized video/images cannot be shown on the display.

The data may be stored internally within the display for later access by the user or may be streamed out of the display in real time to a remote storage device. The data can be used to indicate failures in some of the display componentry or the transmission of the video/audio signals and can also provide input as to the actual performance of the display. Some end-users may require confirmation that images/video were in fact shown and embodiments help to collect the data which can determine whether the displays are meeting the required characteristics. The data can be plotted and analyzed in a number of ways to evaluate the performance of the display.

The foregoing and other features and advantages will be apparent from the following more detailed description of the particular embodiments of the invention, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
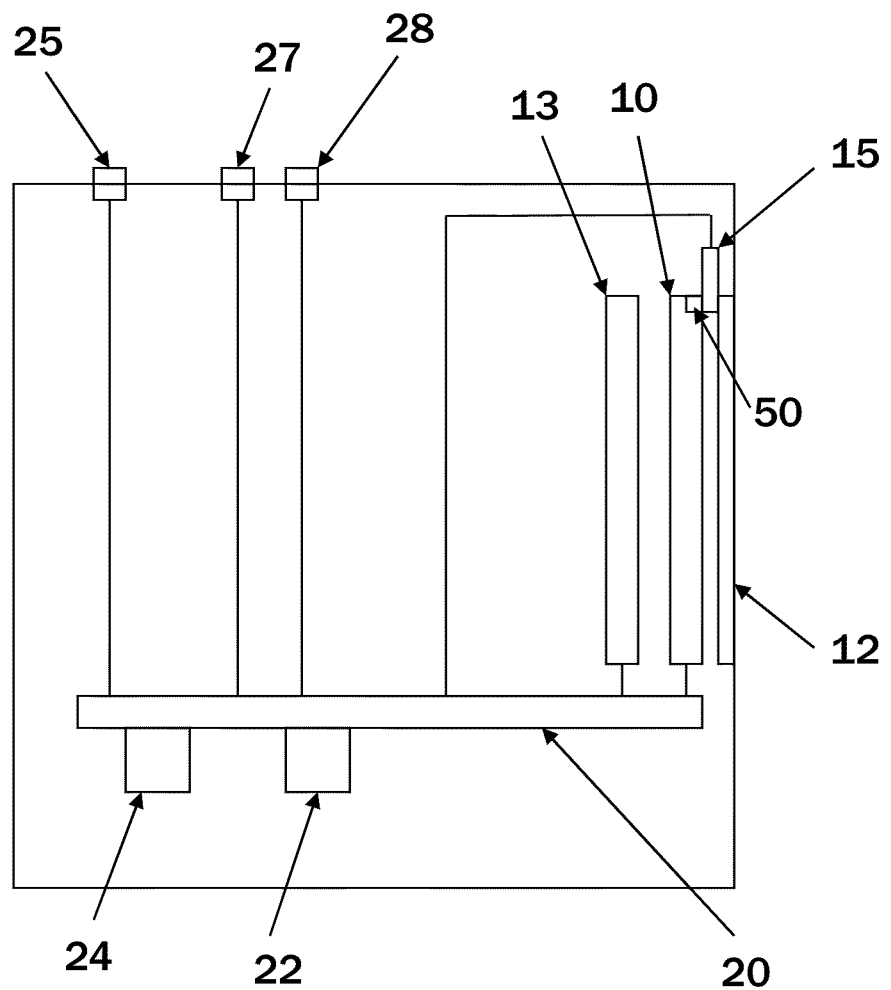
FIG. 1 shows an electrical schematic for a display which contains an embodiment of the image verification system.

FIG. 1 shows an electrical schematic for a display which contains an embodiment of the image verification system. A light sensor 15 may be placed in front of the information block 50, which may be a portion of the image-producing side of the display assembly 10. In this embodiment, the light sensor 15 is placed between the display assembly 10 and a front display plate 12 which may protect the display or provide additional optical properties (anti-reflection, polarization, optical matching, light absorption, etc.). This is not necessary but may be preferable to protect the various components if the display will be subject to vandalism, environmental damage, or other impact from foreign objects. The specific embodiment shown in FIG. 1 could be used with an LCD display, where the display assembly 10 may be an LCD stack with an associated backlight assembly 13 placed behind the LCD stack. Other embodiments may use other types of display assemblies, and sometimes a backlight assembly 13 may not be necessary. Specifically, when using plasma, organic LED, light-emitting polymer, field emission display, or organic electro luminescence technology as the display assembly 10 there may be no associated backlight assembly. Any type of electronic assembly for creating an image with a plurality of smaller image elements (ex. pixels) can be used as the display assembly 10 in any embodiment herein. It should be noted that the information block 50 does not have a required shape (i.e. it does not actually have to be a block, square, or rectangle). The information block 50 is simply a grouping of smaller image elements which are designated for displaying the encoded unique identifier.

The display assembly 10, light sensor 15, and backlight assembly 13 (if necessary) may be connected to a backplane 20 which can provide communication between the various components of the display. One or more power modules 22 and a display controller assembly 24 may also be in electrical communication with the backplane 20. The display controller assembly 24 may include several different components including, but not limited to a video receiving unit, decompressor, timing and control board (TCON), and display interface board (DIB). The display controller assembly 24 can also contain a local storage device (ex. hard drive, flash drive, re-writable memory, etc) so that information about the display (including information gathered from the light sensor 15) may be stored locally for possible later retrieval by the user.

The display may contain several inputs and output interfaces. A video input 25 accepts the video data from a video source and may connect to the backplane 20 or may connect directly to the display controller assembly 24. A network interface 27 may be used to provide communication between the display and the user. Through the network interface 27, the user can monitor the display's performance and possibly change various display settings. A power input 28 can provide power to the display components. Of course, some embodiments may use a different combination of input and output interfaces. For example, some embodiments may use a single interface for both receiving video/audio data as well as communicating display data back to the user. In an exemplary embodiment, network interface 27 would be a two-way wireless connection or wireless network card. The number and style of input and output connections can vary depending on the particular application and would not be outside the scope of the exemplary embodiments.

The use of a backplane 20 is not required as each component could be in electrical communication through wiring which runs to each component. However, it has been found that manufacturing times may be decreased by allowing each component to simply connect with the backplane 20 and through the backplane 20 the components may communicate with each other. Thus, the backplane 20 could be one or more printed circuit boards with connections for each electrical component and conduction lines which permit each component to communicate with one another.

The data for the information block 50 may be sent to the display assembly 10 by one or more components of the display controller assembly 24. The information block 50 may be a grouping of image-producing elements (sometimes pixels) on the display assembly 10 which are selected to display a set pattern for measurement by the light sensor 15. The information block 50 could be placed anywhere on the display, but since the light sensor 15 should preferably be placed in front of a portion of the viewable (image-producing) area of the display assembly 10, the information block 50 should preferably be placed in a corner or near the edge of the display assembly 10 so that the image is only disrupted a minimal amount.

Figure 2:
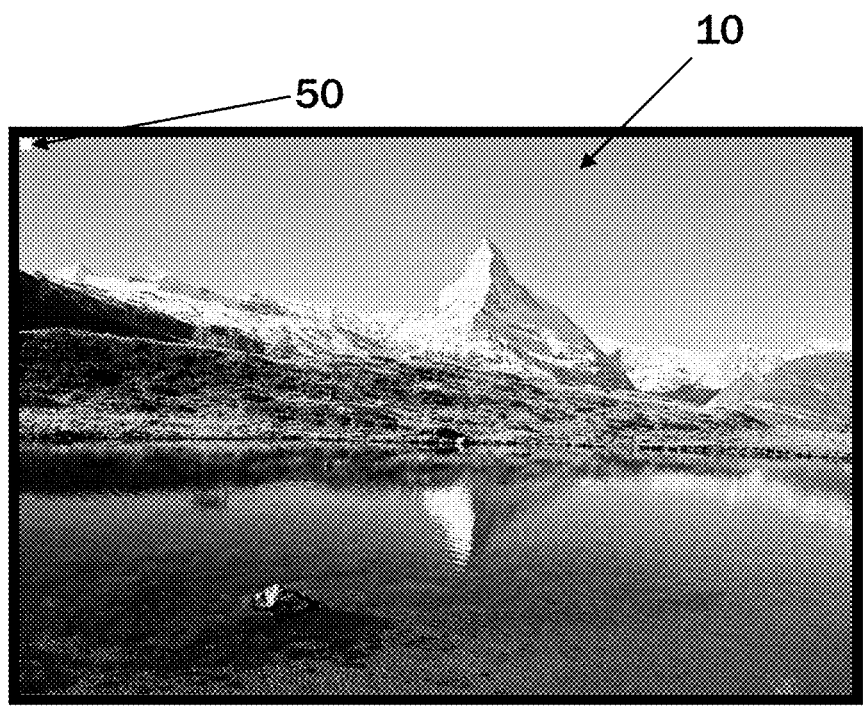
FIG. 2 shows a front view of one embodiment for placement of the information block on the image-producing portion of the display assembly.

FIG. 2 shows one embodiment for placement of the information block 50 on the image-producing portion of the display assembly 10. Preferably, the light sensor 15 (not shown in this Figure for clarity) is placed in front of the information block 50. The sensor 15 may or may not be placed behind a transparent front display plate. To minimize the impact on the viewable image on the display, the information block 50 and sensor 15 should be relatively small and should preferably be placed relatively close to a corner or edge of the display assembly 10. Obviously, one of ordinary skill in the art can place the sensor in a number of different places to provide the same effect. Multiple sensors could be also be used to provide additional measurements, or perhaps measure different information blocks simultaneously (possibly containing different information).

Figure 3:
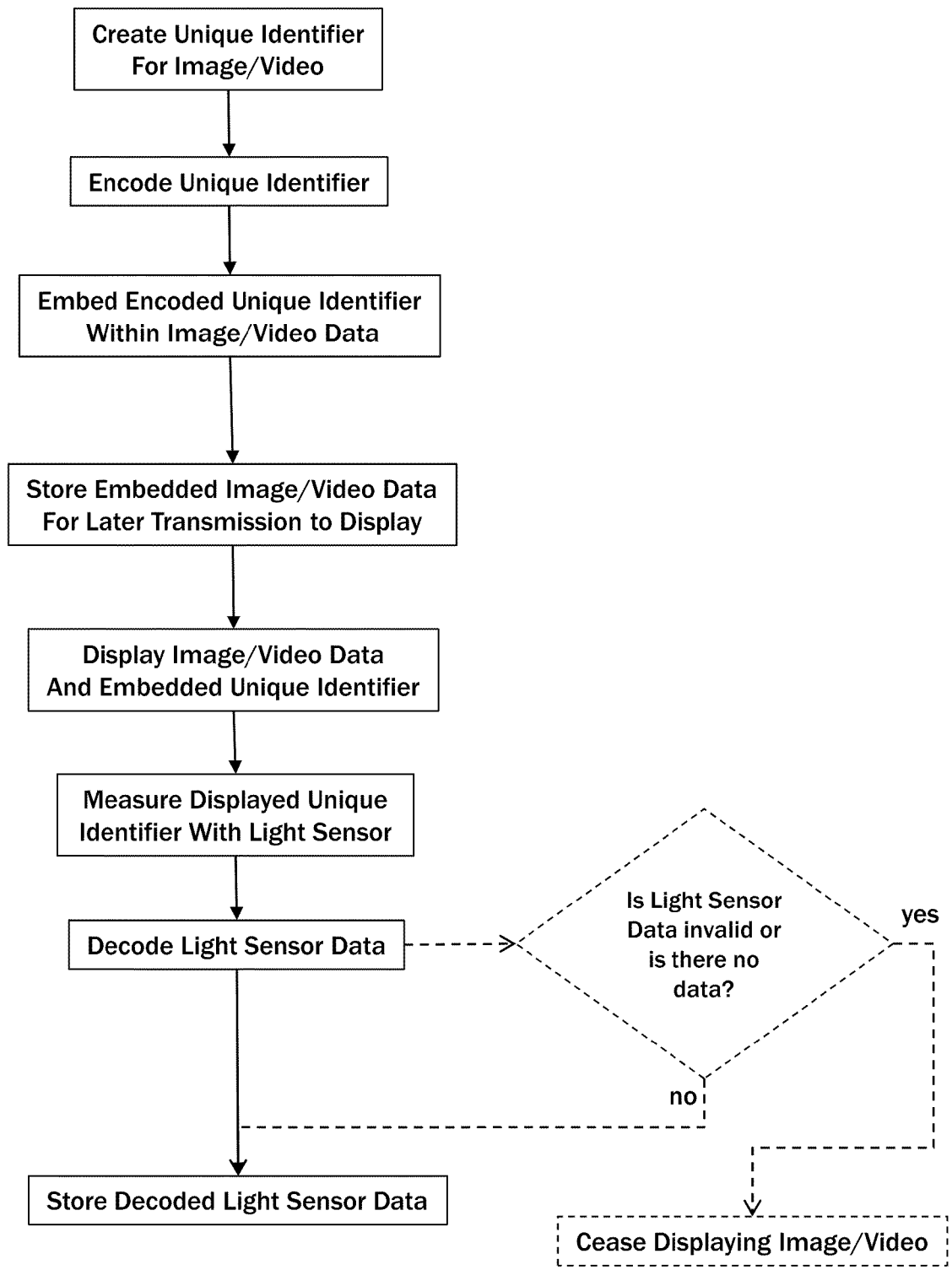
FIG. 3 shows a flow chart for an exemplary embodiment for performing the image verification process.

FIG. 3 shows a flow chart for an exemplary embodiment for performing the image verification process. Once the desired image/video content has been created, a unique identifier may be created which corresponds to the particular image/video content which is to be displayed. As discussed below, the unique identifier can take many forms and can be created in many different ways. Next, the unique identifier may be converted into a format that can be shown by the information block 50 and verified by the light sensor 15. Thus, the unique identifier should be encoded. In one embodiment, the encoding process may convert the unique identifier into a packet of data. In some embodiments, the packet may comprise a header, base value, checkcount, data stream, and a checksum. The header portion of the packet may be used to mark the beginning of the packet and could also optionally serve as a synchronization signal to the decoder. The base value may be used to provide the initialization data that is loaded into the decoder. The checkcount portion of the packet may be used to indicate how many bits of data comprise the data stream. The data stream may comprise the actual encoded unique identifier. Finally, the checksum portion of the packet would allow the software to verify that all of the data bits for the unique identifier were read correctly. When using encryption and other types of security features, the packets can become more complicated. Several encryption methods/techniques are discussed further below.

Once the unique identifier has been encoded, it should preferably be embedded within (or otherwise associated with) the image/video data that it represents. This could be accomplished in a number of ways, essentially one would remove a portion of the image elements for the image/video frames (those that would correspond with the information block) and replace them with image elements that correspond with the encoded unique identifier. The embedding process could be accomplished by the encoder (or the same PCU/processor that is performing the encoding process) or it could be a separate piece of hardware. The embedded version of the image/video data may then be stored for later transmission to a display. Once it has been transmitted to a display, the embedded unique identifier should be displayed simultaneously with the image/video that it represents. Depending on the length of time that the image/video is being displayed, the encoded unique identifier may be shown one or more times by the information block. While displaying the unique identifier, the information block may be measured with the light sensor and the data from the light sensor is then decoded and stored. The decoded light sensor data could be stored locally (i.e. at the display) and later accessed by a user from one of the network connections. Alternatively, each time the light sensor data is stored it could be pushed to an external network server or computer database for later access by a user. Alternatively, the data could be pushed to an external network server or computer hourly, daily, or once a certain amount of data had been locally stored. Further, the light sensor data could be immediately analyzed to determine if the decoded unique identifier matches the original unique identifier. If not, an error could be stored or an error message could be sent to the user through email, text message, or other notification on a web application. Otherwise, the decoded light sensor data could be simply stored for later access and analysis by a user. The decoded light sensor data could also be stored with the corresponding data of when it was shown, the display on which it was shown, and other corresponding data. Thus, all of the stored data could be analyzed to determine if/when there was a failure, how long the failure lasted for, precisely which images/videos were shown (or failed to show) along with their frequency and precise display locations (geographical).

In some embodiments, a security feature could be enabled where the light sensor data is analyzed in real time to ensure that the current video/image data is an authorized transmission. For example, the light sensor data could be analyzed for proper formatting or even for existence at all. If no light sensor data is being decoded or if the light sensor data is not of the expected format, the current video/image display may cease as this may not be the intended and authorized transmission. This can be especially useful when trying to prevent tampering or 'hackers' from sending unauthorized video/images to the display.

In some embodiments, the unique identifier could also be encrypted so that it could not be falsified or altered. As one example, the encoder and decoder may include an encrypting and decrypting process. More specifically, a binary scrambling descrambling algorithm could be used by the encoder and decoder respectively. Thus, in addition to the header, base value, checkcount, data stream, and checksum portions of the packet discussed above, it may also include a version portion. The version portion of the packet may be used to tell the decryptor which algorithm to use for decoding/decrypting/descrambling the incoming data. Any number of encryption methods could be employed, including but not limited to: the Data Encryption Standard (DES) as well as feeding long pseudorandom binary number generators (PSR) which employ Gold or Kasami codes.

Figure 4:
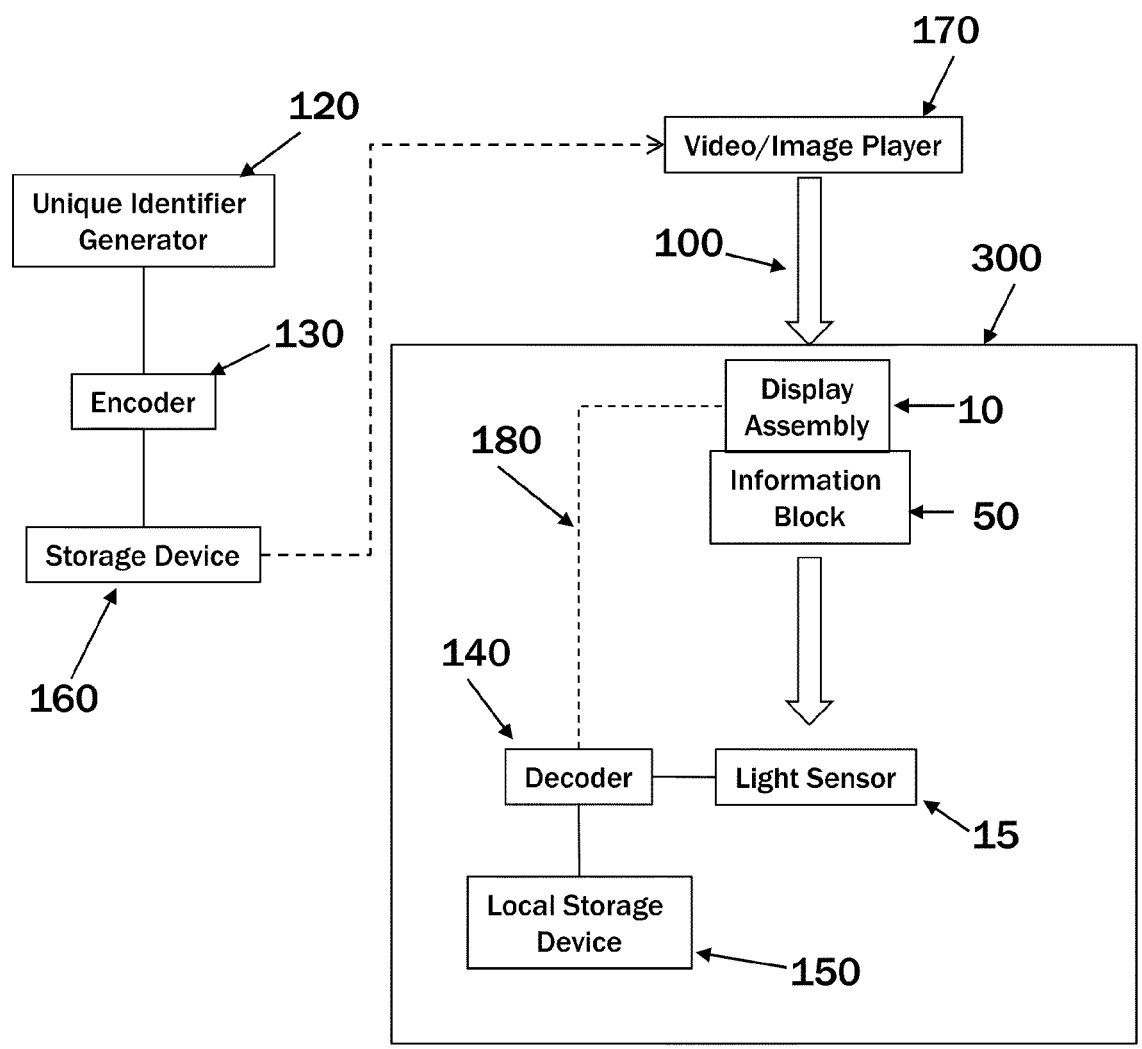
FIG. 4 shows an electrical block diagram for an embodiment of the image verification system.

FIG. 4 provides an electrical block diagram for an embodiment of the image verification system. In this embodiment, a unique identifier generator 120 may be in electrical communication with an encoder 130 which may encode the unique identifier and embed the encoded version within the video/image data. The resulting video/image data with the embedded unique identifier may then be sent to a storage device 160 for later access. The video/image data with the embedded unique identifier may then be transferred to a video/image player 170. This transfer could occur in many ways including but not limited to: portable storage media (CD, DVD, BlueRay, flash drive, solid state memory, etc.) or a wired/wireless network/internet transfer. The video/image player 170 can then transmit 100 the data to the display 300. The transmission 100 could occur through any wired or wireless connection. Once received at the display 300, the data may be sent to the display assembly 10 and the information block 50.

Of course, the electrical communication between the video/image player 170 and information block 50 may have additional elements in-between. For example, the data coming from the video/image player 170 may be sent to a display controller/TCON board prior to being sent to the display assembly 10 (and information block 50). The precise path for the encoded unique identifier is not critical, only that the encoded data reaches the information block 50 for display along with the video/image content. Once displayed on the information block 50, the optical data may be read by the light sensor 15 and preferably transmitted to a decoder 140. Once decoded, the data from the light sensor 15 may be sent to a local storage device 150. The decoder 140 and local storage device 150 may be contained within the display controller assembly 24 or may be separate subassemblies which are in electrical communication with the backplane 20. Thus, the decoder 140 and local storage device 150 may simply be components of a central processing unit (CPU). Either the decoder 140 or the CPU may analyze the data from the light sensor 15 to determine if it is in the proper format of an expected unique identifier (or if the data is remotely close to the expected type). If the decoder 140 or CPU's analysis determines that the data from the light sensor 15 is unexpected or improper, then either the decoder 140 or CPU may direct the display assembly 10 to stop displaying the video/image as it may be unauthorized content. Some type of electrical communication 180 between the decoder 140 or CPU may be established with the display assembly 10 if this desired security feature is enabled.

With this embodiment, when the video/image content is created it can also be associated with a unique identifier. Thus, rather than conducting a software analysis of the content of the video/image data (discussed below in reference to FIG. 5), the video/image content creator can simply assign a unique identifier to the video/image data. This could be done in many ways. A format may be used where a series of numbers are used to identify the client, content, version, and any other relevant information that could be used to identify the particular piece of video/image data. The unique identifier could also be provided by any random number. The only requirement is that the unique identifier can be used to identify the specific piece of video/image data. Thus, the unique identifier generator 120 may not be necessary if the unique identifier is manually created by the content creator. The unique identifier could simply be entered into the encoder 130.

It should be noted that although shown in separate blocks, some of the elements in FIG. 4 may exist in a single piece of hardware. Thus, a single CPU may contain the unique identifier generator 120, encoder 130, and the storage device 160. Further, a single CPU may contain the decoder 140 and local storage device 150. In essence, many of the separate blocks shown may simply be pieces of software loaded onto one or more CPU's.

Figure 5:
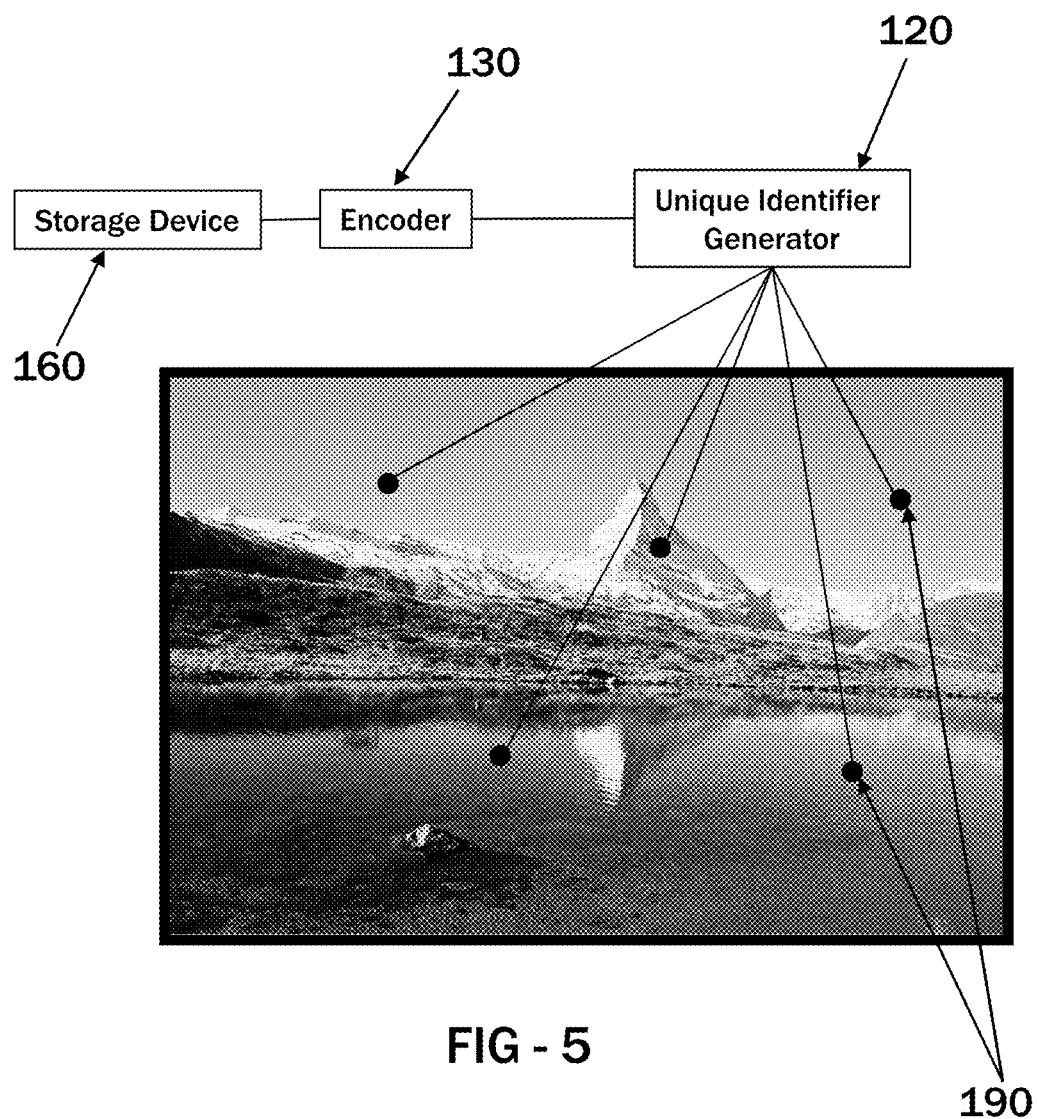
FIG. 5 shows an electrical block diagram for one embodiment for generating the unique identifier by conducting an analysis of the video/image content.

FIG. 5 shows one embodiment for generating the unique identifier by conducting an analysis of the video/image content. In this embodiment, various samples of data are taken from the video/image content in order to identify the content. Thus, several data points 190 may be sampled from the video/image and sent to the unique identifier generator 120 where they can be converted into a unique identifier for the video/image. The unique identifier can be sent to an encoder 130 and the resulting data can be sent to a storage device 160. The data points 190 may be a pre-selected group of image elements (ex. pixels) and may remain the same each time a video/image is sampled or could change in a specific manner. The pixel elements could be analyzed in any number of ways and the resulting analysis can be converted into the unique identifier as a way of 'fingerprinting' the video/image. When using video, a particular frame may be chosen for this fingerprinting analysis.

The encoded unique identifier may be designed to correspond with the particular type of light sensor 15 being used. There are many ways to accomplish this in order to optically transmit the unique identifier through the display assembly (information block 50) and to the light sensor 15.

In a first embodiment, the light sensor 15 may simply be designed to interpret between black and white shapes. Thus, black may represent 0, white may represent 1, and the encoded unique identifier can be represented in this simple binary format to the light sensor 15.

In a second embodiment, the light sensor 15 may be designed to interpret between additional colors: red, blue, green, and white where each shade could take on a two bit value and represent 0, 1, 2, and 3 respectively. Any type of color light sensor could be used here while an exemplary color light sensor might be the TCS3404CS or TCS3414CS which are commercially available from Texas Advanced Optoelectronic Solutions® (TAOS) of Plano, Tex. www.taos-inc.com. The TAOS specification document TAOS068 entitled TCS3404CS, TCS3414CS Digital Color Light Sensors' is herein incorporated by reference in its entirety.

In a third embodiment, the light sensor 15 may be a CCD camera and could thus interpret a matrix of time varying image elements in the information block 50. As is known in the art, the size of the light measurement elements of CCD cameras are typically much smaller than the size of pixel elements of electronic displays. Thus, a CCD camera (or similar type of light measurement device) could interpret several 'data points' (i.e. groupings of image pixels) simultaneously and could therefore transfer more data in the same amount of time.

Some embodiments may not report errors out to the user immediately, but instead may simply store the data internally for later retrieval by the user. In an exemplary embodiment, the performance data may be accessed by the user through a web browser which communicates with one of the network interfaces of the display. Once the data is retrieved and analyzed it may be determined that the display has malfunctioned and may continue to malfunction and possibly needs servicing or replaced.

Exemplary embodiments provide constant feedback on the performance of the display and can quickly notify the user that the display is not functioning properly. Notifications may be sent to the user's computer, cell phone, or smart device through any of the output data interfaces. A variety of internet notifications could be sent to the user through the network interface 27. Notifications could include email, instant messaging, text messaging, or a web page which can be accessed by the user and may contain the data for a number of different displays. Prior to the exemplary embodiments herein, a user would have no notice of a malfunctioning display unless actually observed by the user. The display may have been malfunctioning for some time before the user actually notices the failure. Further, in some applications there may be many displays installed and it may be very difficult to constantly monitor each displays performance. The exemplary embodiments allow constant monitoring from a remote location.

The display controller assembly 24 may generate and display the same information block regardless of the video which is being displayed. This style may be adopted when the display performance parameters are the only main concern to the user. Alternatively, each video stream may include its own specific information block. This method would be advantageous if the user desired to measure the precise amount of time that each video is being displayed and confirming that the video was actually shown on a particular display. This would allow an advertising firm to determine exactly how long each client's advertisements were shown and on which specific displays. This can be advantageous when many different displays are being used to advertise for many different clients. This would also permit very precise and accurate billing to the clients of the advertising firm. As mentioned above, advertising prices could vary depending on location of the display, time of day shown, and the number of times the ad was shown.

The embodiments herein allow for a near instantaneous detection of failures in communication between display components, including but not limited to the TCON, DIB, display assembly, all of the cabling/connections in between, as well as the video/image signal transmitting and receiving devices.

For advertising/information applications it may be important to be able to determine if video/images were actually properly transmitted to a display and then ultimately shown on the screen. There are several components that must work in harmony and a failure can result in loss of video to some or all of the displays. When using wireless transmission systems, other wireless systems or electromagnetic interference can also prevent some displays from receiving the video signals and displaying them properly. It is important that some advertising companies can actually confirm that certain portions of video were actually shown on a specific number of displays. The embodiments herein allow them to carefully track which video segments were shown, how long, and precisely on which displays. Advertisers may even charge a different rate for each display (depending on its location) or time of day.

It has been found, that in some applications where the display is used in an outdoor and/or bright ambient environment, the ambient light may reflect off the display assembly and enter the light sensor 15. In these applications, the light sensor 15 may become oversaturated with light so that it may not be able to accurately read the optical performance of the information block. In these situations it has been found that placing a filter between the light sensor 15 and the display assembly may alleviate some or all of these problems. An exemplary embodiment may use a 'hot mirror' type IR filter. Some embodiments may use any type of filter that removes or reduces electromagnetic radiation having wavelengths longer than 600-650 nanometers.

It should be noted that while certain embodiments are described with respect to images, video, or video/image content, these terms are largely interchangeable because video is essentially a series of images. While compression techniques are often used with video where entire full frames are not sent as the content (i.e. only 1 out of every 3 or 4 frames is a full frame and the system may interpolate between the full frames) the embodiments herein can be used for still images as well as a series of images or partial images which can be used to produce video.

Having shown and described preferred embodiments, those skilled in the art will realize that many variations and modifications may be made to affect the described embodiments and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A method for creating a verifiable image comprising the steps of:
presenting an image frame;
creating a unique identifier for the image frame;
encoding the unique identifier; and
embedding the encoded unique identifier within the image frame by removing a portion of the image elements for the image frame and replacing them with image elements corresponding with the encoded unique identifier so that the encoded unique identifier and image frame are capable of being displayed simultaneously on a display.

2. The method of claim 1 wherein:
the step of creating a unique identifier for the image frame is performed by manually selecting a numeral identifier.

3. The method of claim 1 wherein:
the step of creating a unique identifier for the image frame is performed by sampling various elements of the image frame.

4. A method for verifying the display of an image comprising the steps of:
presenting an image frame;
creating an unique identifier for the image frame;
encoding the unique identifier;
embedding the encoded unique identifier within the image frame by removing a portion of the image elements for the image frame and replacing them with image elements corresponding with the encoded unique identifier so that the encoded unique identifier and image frame are capable of being
displayed simultaneously on a display;
displaying the encoded unique identifier and image frame;
sensing the encoded unique identifier with a light sensor to produce light sensor data;
decoding the light sensor data; and
storing the decoded light sensor data.

5. The method of claim 4 further comprising the step of:
comparing the decoded light sensor data to the unique identifier.

6. The method of claim 4 wherein:
the encoded unique identifier is displayed by a series of solid-colored shapes.

7. The method of claim 4 further comprising the step of:
providing access to the decoded light sensor data through a network connection.

8. A method for securely transmitting and displaying video data having a plurality of frames where a series of frames have a unique identifier embedded within an information block portion of each frame, the method comprising the steps of:
transmitting the video data to an electronic display;
receiving the video data at the electronic display;
displaying the video data;
measuring the information block portion of each frame with a light sensor to produce light sensor data;
analyzing the light sensor data; and
stop displaying the video data if the light sensor data does not contain a unique identifier in the proper format.

9. The method of claim 8 further comprising the step of:
storing the light sensor data if the data contains a unique identifier in the proper format.

10. The method of claim 8 wherein:
the unique identifier is displayed as a series of solid-colored shapes within the frame.

11. The method of claim 9 further comprising the step of:
providing access to the stored light sensor data through a network connection.

12. A system for securely transmitting video or images having an embedded unique identifier to an electronic display, the system comprising:
a player which transmits the video or image data;
a display assembly which receives and displays the video or image data;
an information block within the display assembly which displays the unique identifier;
a light sensor in front of the information block which senses the information block and produces light sensor data;
a central processing unit (CPU) in electrical communication with the light sensor and display assembly which receives the light sensor data and stores the light sensor data if the data contains a unique identifier or directs the display assembly to stop displaying the video or image if the data does not contain a unique identifier.

13. The system of claim 12 further comprising:
a network connection in electrical communication with the CPU.

14. The system of claim 12 wherein:
the display assembly displays the unique identifier as a series of solid-colored shapes within video or image.

15. The system of claim 12 wherein:
the display assembly is a liquid crystal display.

16. The system of claim 12 wherein:
the display assembly is an OLED display.

* * * * *